United States Patent [19]

Nagaoka et al.

[11] Patent Number: 5,506,305
[45] Date of Patent: Apr. 9, 1996

[54] THERMOPLASTIC RESIN COMPOSITIONS COMPRISING POLYPHENYLENE ETHER, POLYAMIDE AND BLOCK COPOLYMERS

[75] Inventors: Kenji Nagaoka; Takashi Sanada; Yasuhito Ijichi, all of Ichibara, Japan

[73] Assignee: Sumitomo Chemical Company Limited, Osaka, Japan

[21] Appl. No.: 159,557

[22] Filed: Dec. 1, 1993

Related U.S. Application Data

[63] Continuation-in-part of Ser. No. 914,411, Jul. 17, 1992, abandoned.

[30] Foreign Application Priority Data

Jul. 22, 1991 [JP] Japan ................... 3-206486

[51] Int. Cl.$^6$ .................. C08L 53/02; C08L 71/12; C08L 7/06
[52] U.S. Cl. .................. 525/92; 525/397; 525/905
[58] Field of Search ................ 525/92, 397, 905

[56] References Cited

U.S. PATENT DOCUMENTS

| | | |
|---|---|---|
| 4,315,086 | 2/1982 | Ueno et al. . |
| 4,600,741 | 7/1986 | Aycock et al. . |
| 4,654,405 | 3/1987 | Jalbert et al. ................ 525/397 |
| 4,659,760 | 4/1987 | van der Meer . |
| 4,659,763 | 4/1987 | Gallucci et al. . |
| 4,732,937 | 3/1988 | Sybert et al. . |
| 4,798,865 | 1/1989 | Grant et al. . |
| 4,873,276 | 10/1989 | Fujii et al. . |
| 4,923,924 | 5/1990 | Grant et al. ................ 525/397 |
| 4,943,399 | 7/1990 | Taubitz et al. ............... 525/397 |
| 4,957,965 | 9/1990 | Taubitz et al. . |
| 4,968,749 | 11/1990 | Shibuya et al. . |

FOREIGN PATENT DOCUMENTS

| | | |
|---|---|---|
| 0046040 | 2/1982 | European Pat. Off. . |
| 0269748 | 6/1988 | European Pat. Off. . |
| 59-59724 | 4/1984 | Japan . |
| 59-86653 | 5/1984 | Japan . |
| WO8508372 | 12/1985 | WIPO . |
| WO8700540 | 1/1987 | WIPO . |
| WO8806173 | 8/1988 | WIPO . |

*Primary Examiner*—Thomas Hamilton, III
*Attorney, Agent, or Firm*—Cushman Darby & Cushman

[57] ABSTRACT

Disclosed is a thermoplastic resin composition comprising a polyphenylene ether and a polyamide and excellent in impact strength wherein an impact strength modifier having structure A—B—A (A or B is styrene) is partially dispersed in said polyphenylene ether and has layered or spherical structure of about 0.02–0.07 μm.

A process for producing the thermoplastic resin composition is also disclosed which comprises (1) previously melt kneading (i) at least one compatibilizing agent in an amount effective for compatibilization and (ii) a polyphenylene ether, and then (2) adding (iii) a polyamide in an amount necessary for formation of continuous phase and (iv) an impact strength modifier having structure A—B—A (A or B is styrene) and melt kneading the mixture at a maximum shear rate of 700 sec$^{-1}$ or more.

14 Claims, 2 Drawing Sheets

THERMOPLASTIC RESIN COMPOSITIONS COMPRISING POLYPHENYLENE ETHER, POLYAMIDE AND BLOCK COPOLYMERS

RELATED APPLICATION

This is a continuation-in-part of U.S. Ser. No. 07/914,411 filed Jul. 17, 1992 now abandoned.

FIELD OF THE INVENTION

The present invention relates to thermoplastic resin compositions which can be made into three-dimensional articles and sheets by injection molding, extrusion molding and blow molding and can be used as automobile parts and electrical parts.

More particularly, it relates to novel thermoplastic resin compositions comprising at least one compatibilizing agent, polyphenylene ether (PPE) and polyamide in which an impact strength modifier having a styrene-containing A—B—A block structure in the form of a specific micro phase separation structure, thereby to balance heat resistance and impact resistance.

BACKGROUND OF RELATED ART

U.S. Pat. No. 4,315,086 discloses, as compatibilizing agents for polyamides and polyphenylene ethers, liquid diene polymers, epoxy compounds and compounds having in the molecule beth (a) carbon-carbon double bond or carbon-carbon triple bond and (b) carboxylic acid group, acid anhydride group, acid amide group, imide group, carboxylate group, amino group or hydroxyl group. The above patent further discloses, as impact strength modifiers, ethylene propylene rubbers, ethylene propylene polyene rubbers or these rubbers modified with unsaturated carboxylic acids, SBR, polybutadienes, diblock copolymers or triblock copolymers of polystyrene-diene rubbers and partial hydrogenated products thereof.

Japanese Patent Kokai Nos. 59-59724 and 59-86653, U.S. Pat. No. 4,654,405 and PCT Laid-Open Application WO87/00540 disclose processes for producing compositions by grafting unsaturated carboxylic acids on polyphenylene ethers in the presence or absence of free-radical initiators and then mixing polyamides with the products.

EPC Laid-Open Application EP-0046040 discloses alkenyl aromatic compounds, $\alpha,\beta$-unsaturated dicarboxylic acid anhydrides or imide compounds thereof as compatibilizing agents for polypheylene ethers and polyamides.

PCT Laid-Open Application WO85-05372 discloses aliphatic polycarboxylic acids such as malic acid, U.S. Pat. No. 4,659,760 discloses polyethylene oxide waxes, U.S. Pat. No. 4,659,763 discloses quinones, U.S. Pat. No. 4,732,937 discloses polyphenylene ethers made functional by epoxy compounds, and U.S. Pat. No. 4,600,741 discloses polyfunctional compounds comprising anhydrotrimellitic acid chloride as compatibilizing agents for polyphenylene ethers and polyamides. These compounds all can be used as compatibilizing agents in the present invention as mentioned hereinafter.

Japanese Patent Kokai Nos. 63-108060 and 63-113071 and PCT Laid-Open Application WO88/06173 disclose compositions comprising combination of non-crystalline polyamides with compatibilizing agents, polyphenylene ethers and crystalline polyamides.

In the conventional processes, there has not yet been found optimum structures of thermoplastic resin compositions comprising of polyphenylene ethers and polyamides in which A—B—A block copolymers containing styrene are used as impact strength modifiers.

In conventional processes, the styrene-containing A—B—A block copolymers (especially, styrene-butadiene-styrene copolymers) are present in a sufficiently dispersed state in polyphenylene ethers. (See FIG. 3)

FIG. 3 (Prior Art) is a transmission electron photomicrograph of the composition of Comparative Example 4 which shows the structure where polyphenylene ether (grey spheres) is dispersed in matrix (white) and rubber particles (black) are dispersed in the form of lumps in the polyphenylene ether.

When the dispersion has such a structure, the effect of impact strength improvers is lowered. Increases in the amount of impact strength modifiers for improving impact strength brings about deterioration of heat resistance. When the amount of polyphenylene ether is increased for inhibiting the deterioration of heat resistance, flowability decreases and moldability deteriorates.

SUMMARY OF THE INVENTION

For solving the above problems, the present invention provides thermoplastic resin compositions having an excellent balance of flowability, impact resistance and heat resistance by dispersing partially in polyphenylene ether a styrene-containing A—B—A block copolymer in an extremely fine layered or spherical micro phase separation structure of 0.02–0.07 μm.

The present invention relates to thermoplastic resin compositions comprising of polyphenylene ether (PPE) and polyamide, characterized in that an impact strength modifier having the structure A—B—A (wherein A or B is styrene) is partially dispersed in PPE and has a layered or spherical structure of about 0.02–0.07 μm.

The present invention further relates to a thermoplastic resin composition comprising:

a polyphenylene ether;

a polyamide in an amount necessary for formation of a continuous phase;

a compatibilizing agent in an amount effective for compatibilization; and an impact strength modifier having a structure A—B—A being partially dispersed in said polyphenylene ether in the form of a layered structure, each layer having a width of about 0.02–0.07 μm, or a spherical structure, each sphere having a diameter of about 0.02–0.07 μm, A or B being styrene and a number-average molecular weight of styrene units is 10,000 or more, and said composition being produced by a process comprising (1) previously preparing a modified-polyphenylene ether by melt kneading (i) said compatibilizing agent and (ii) said polyphenylene ether, and then (2) under melting states of said modified-polyphenylene ether, adding (iii) said polyamide and (iv) said impact strength modifier and melt kneading the mixture at a shear rate of 700 sec$^{-1}$ or more.

DETAILED DESCRIPTION OF THE INVENTION

Figure 1:
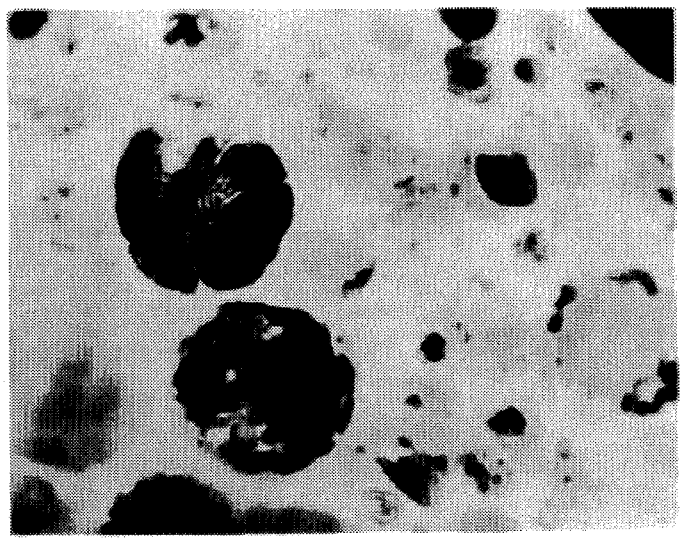
FIG. 1 is an electron microphotograph which shows the particle structure of the composition of Example 1.

The polyphenylene ether (ii) used in the present invention is a polymer obtained by oxidative polymerization of one or more phenol compounds represented by the following formula:

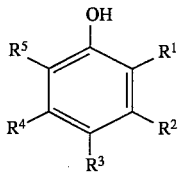

wherein $R^1$, $R^2$, $R^3$, $R^4$ and $R^5$ each represents a hydrogen atom, a halogen atom or a substituted or unsubstituted hydrocarbon group and may be identical or different, but at least one of them is a hydrogen atom, with oxygen or a gas containing oxygen using an oxidative coupling catalyst.

Examples of $R^1$, $R^2$, $R^3$, $R^4$ and $R^5$ in the above formula are hydrogen atom, halogen atoms such as chlorine, bromine, fluorine and iodine, and hydrocarbon or substituted hydrocarbon groups of 1–18 carbon atoms, for example, alkyl or substituted alkyl groups such as methyl, ethyl, n-propyl, iso-propyl, pri-, sec- or t-butyl, chloroethyl, hydroxyethyl, phenylethyl, hydroxymethyl, carboxyethyl, methoxycarbonylethyl and cyanoethyl, aryl or substituted aryl groups such as phenyl, chlorophenyl, methylphenyl, dimethylphenyl and ethylphenyl, benzyl group and allyl group.

Examples of the phenol compounds as shown by the above formula are phenol, o-, m- or p-cresol, 2,6-, 2,5-, 2,4- or 3,5-dimethylphenol, 2-methyl-6-phenylphenol, 2,6-diphenylphenol, 2,6-diethylphenol, 2-methyl-6-ethylphenol, 2,3,5-, 2,3,6- or 2,4,6-trimethylphenol, 3-methyl-6-t-butylphenol, thymol and 2-methyl-6-allylphenol. Alternatively, there can be used copolymers of the compounds of the above formula with other phenol compounds, for example, polyhydroxy aromatic compounds such as bisphenol-A, tetraboromobisphenol-A, resorcin, hydroquinone and novolak resin.

Preferable compounds are homopolymers of 2,6-dimethylphenol or 2,6-diphenylphenol and copolymers of a large amount of 2,6-dimethylphenol and a small amount of 3-methyl-6-t-butylphenol or 2,3,6-trimethylphenol.

Any oxidative coupling catalysts can be employed for oxidative polymerization of the phenol compounds, so long as they have polymerization ability. Examples are cuprous salts-tert. amines such as cuprous chloride-triethylamine and cuprous chloride-pyridine; cupric salts-amines-alkali metal hydroxides such as cupric chloride-pyridine-potassium hydroxide; manganese salts-primary amines such as manganese chloride-ethanol amine and manganese acetate-ethylenediamine; manganese salts-alcolates or phenolates such as manganese chloride-sodium methylate and manganese chloride-sodium phenolate; and cobalt salts-tert. amines.

Oxidative polymerization temperatures, for preparing polyphenylene ether is 40° C. or higher (high temperature polymerization) or lower (low temperature polymerization). Either temperature range can be used, although polymers produced thereby have different properties.

The polyamide (iii) used in the present invention is at least one polyamide selected from crystalline aliphatic polyamides and aromatic polyamides.

The crystalline aliphatic polyamides used in the present invention include, for example, those which are shown below.

The crystalline aliphatic polyamides can be prepared by bonding equimolar saturted aliphatic dicarboxylic acids containing 4–12 carbon atoms and aliphatic diamines containing 2–12 carbon atoms and in this case, if necessary, diamines, etc. can be used so as to provide amine terminal groups in excess of carboxyl terminal groups in polyamides. On the other hand, it is also possible to use dibasic acids so as to provide excess acidic groups. Similarly, these polyamides can also be satisfactorily prepared from acid-producing and amine-producing derivatives of said acids and amines such as esters, acid chlorides and amine salts. Typical examples of aliphatic dicarboxylic acids used for preparing the polyamides include adipic acid, pimelic acid, azelaic acid, suberic acid, sebacic acid and dodecanedioic acid. Typical examples of aliphatic diamines include hexamethylenediamine and octamethylenediamine. Besides, these polyamides can also be prepared by self-condensation of lactams.

Examples of polyamides are polyhexamethylene adipamide (nylon 66), polyhexamethylene azelamide (nylon 69), polyhexamethylene sebacamide (nylon 610) and polyhexamethylene dodecanoamide (nylon 612), poly-bis-(p-aminocyclohexyl)methanedodecanoamide, polytetramethylene adipamide (nylon 46) and polyamides produced by ring cleavage of lactams, namely, polycaprolactam (nylon 6) and polylauryllactam. Furthermore, there can be used polyamides produced by polymerization of at least two amines or acids used for producing the above polymers, such as polymers produced from adipic acid, sebacic acid and hexamethylenediamine. Polamide blends such as blends of nylon 66 and nylon 6 include copolymers such as nylon 66/6.

As these crystalline polyamides, preferred are nylon 46, nylon 6, nylon 66, nylon 11 and nylon 12. More preferred are nylon 6, nylon 66 and mixtures of nylon 6 and nylon 66 at optional mixing ratios. Moreover, terminal functional groups of these polyamides can suitably comprise mainly amine terminal groups or mainly carboxyl terminal groups of mixtures thereof at optional ratios.

The aromatic polyamides used in the present invention are copolyamides containing aromatic components such as polyhexamethylene isophthalamide (nylon 61). These thermoplastic copolyamides containing aromatic components mean melt-polymerizable polyamides which comprise aromatic amino acids and/or aromatic dicarboxylic acids such as p-aminomethylbenzoic acid, p-aminoethylbenzoic acid, terephthalic acid and isophthalic acid as main constituents.

Diamines which are other constituents of polyamides include, for example, hexamethylenediamine, undecamethylenediamine, dodecamethylenediamine, 2,2,4-/2,4,4-trimethylhexamethylenediamine, m-xylylenediamine, p-xylylenediamine, bis(p-aminocyclohexyl)methane, bis(p-aminocyclohexyl)propane, bis(3-methyl-4-aminocyclohexyl)methane, 1,3-bis(aminomethyl)cyclohexane and 1,4-bis(aminomethyl)cyclohexane. Isocyanates may be used in place of diamines. Examples are 4,4'-diphenylmethane diisocyanate and tolylene diisocyanate.

Comonomers which are optionally used have no special limitation. There can be used compounds derived from lactams, ω-amino acid units of 4–12 carbon atoms or aliphatic dicarboxylic acids of 4–12 carbon atoms and aliphatic diamines of 2–12 carbon atoms, for example, lactams or amino acids such as ε-caprolactam, ω-laurolactam, 11-aminoundecanoic acid and 12-aminododecanoic acid or equimolar salts of the above-mentioned various diamines and adipic acid, azelaic acid or sebacic acid.

Typical examples of thermoplastic aromatic copolyamides comprising these components are copolyamides of p-aminomethylbenzoic acid and ε-caprolactam (nylon AMBA/6), polyamides comprising 2,2,4-/2,4,4-trimethylhexamethylenediamine·terephthalic acid salt as main components (nylon TMDT, TMDT/61), polyamides comprising hexamethylenediamine·isophthalic acid salt and/or hexamethylenediamine·terephthalic acid salt as main components and bis(p-aminocyclohexyl)methane isophthalic acid salt and/or terephthalic acid salt or bis(3-methyl-4-aminocyclohexyl)methane·isophthalic acid salt and/or terephthalic acid salt or bis(p-aminocyclohexyl)propane·isophthalic acid salt and/or bis(p-aminocyclohexyl)propane·terephthalic acid salt as comonomer components (nylon 6I/PACM I, nylon 6I/DMPACM I, nylon 6I/PACP I, nylon 6I/6T/PACM I/PACM T, nylon 6I/6T/DMPACM I/DMPACM T, nylon 6I/6T/PACP I/PACP T), polyamides comprising hexamethylenediamine·isophthalic acid salt or hexamethylenediamine·terephthalic acid salt as main components and ε-caprolactam, 12-aminododecanoic acid, hexamethylenediamine·adipic acid salt, bis(p-aminocyclohexyl)methane·adipic acid salt, bis(3-methyl-4-aminocyclohexyl)methane·adipic acid salt or the like as comonomer components (nylon 6I, 6I/6T, 6I/12, 6T/6, 6T/66, 6I/PACM 6, 6I/DMPACM 6), and polyamides comprising bis(p-aminocyclohexyl)methane·isophthalic acid salt or bis(3-methyl, 4-aminocyclohexyl)methane·isophthalic acid salt as main components and hexamethylenediamine·dodecanoic diacid salt, 12-aminododecanoic acid or the like as comonomer components (nylon PACM I/612, nylon DMPACM I/12).

Among these aromatic polyamides, preferred are amorphous aromatic polyamides.

The amount of polyamide (iii) is necessary for formation of a continuous phase in polyphenylene ether (ii)/polyamide (iii) composition. Preferably, the ratio of polyphenylene ether (ii)/polyamide (iii) is 5/95–70/30, more preferably 10/90–60/40.

As impact strength modifier (iv) having structure of A—B—A (A or B is styrene) used in the present invention, examples are triblock copolymers and radial teleblock copolymers of styrene and conjugated dienes. Diblock copolymers of styrene and conjugated dienes are not preferred because a satisfactory dispersion structure cannot be obtained.

Styrene-butadiene-styrene triblock copolymers are especially preferred.

Furthermore, the molecular weight of the polystyrene chain is preferably 10,000 or more and more preferably 12,000 or more.

The amount of impact strength modifier (iv) is preferably 1–50 parts by weight based on 100 parts by weight of polyphenylene ether (ii)/polyamide (iii), more preferably 5–40 parts by weight.

According to the present invention, it has been found that thermoplastic resin compositions having an excellent balance of properties can be obtained when impact strength modifiers having partially A—B—A structure have a layered or spherical micro phase separation structure of about 0.02–0.07 μm in polyphenylene ethers.

Figure 2:
FIG. 2 is an electron microphotograph which shows the particle structure of the composition of Example 4.
Figure 3:
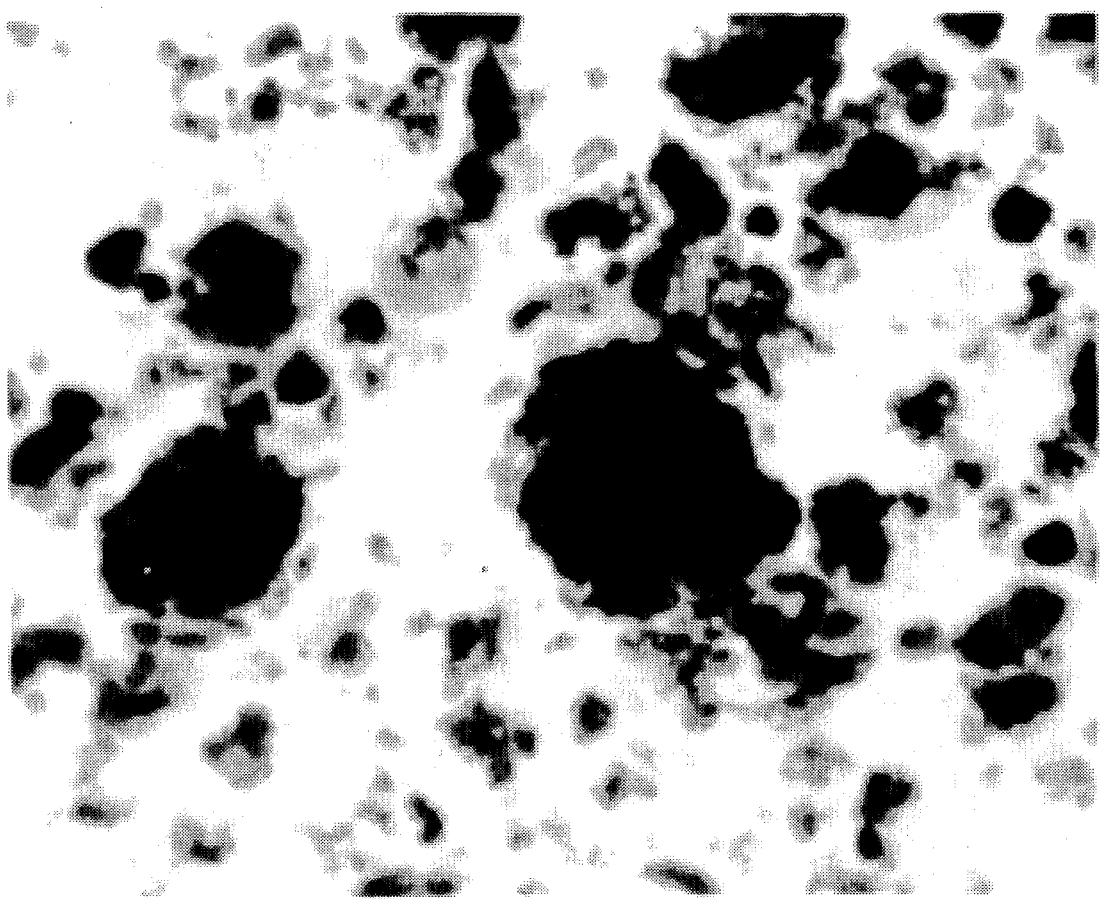
FIG. 3 is an electron microphotograph which shows the particle structure of the composition of Comparative Example 4.

Specific examples of the structure are as shown in FIG. 1 and FIG. 2. The structure shown in FIG. 3 is not preferred.

FIG. 1 is a transmission electron photomicrograph of the composition obtained in Example 1 which shows the structure in which polyphenylene ether (grey spheres) is dispersed in matrix (white) and rubber particles (black) are dispersed in a layered form of about 0.03 μm in the polyphenylene ether.

FIG. 2 is a transmission electron photomicrograph of the composition obtained in Example 4 which shows the structure in which polyphenylene ether (grey spheres) is dispersed in matrix (white) and rubber particles (black) are dispersed in a spherical form of about 0.06 μm in the polyphenylene ether.

Size of the layered or spherical micro phase separation structure was measured in the following manner.

That is, a slice was cut out by a microtome by customary method. The slice was dyed with $OsO_4 \cdot RuO_4$ and observed by a transmission electron microscope.

It is physically preferred that in the case of layered structure, the width of one layer is 0.02–0.07 μm and in the case of micro phase separation structure having spherical structure, the diameter of the spheres is 0.02–0.07 μm.

Furthermore, the thermoplastic resin compositions of the present invention can be produced preferably by the following process.

That is, the compositions can be advantageously obtained by (1) previously preparing a modified-polyphenylene ether by melt kneading (i) at least one compatibilizing agent in an amount effective for compatibilization and (ii) polyphenylene ether and then, (2), under melting states of said modified-polyphenylene ether, adding (iii) polyamide in an amount necessary to form continuous phase and (iv) impact strength modifier having structure of A—B—A (A or B is styrene) to the above kneaded product and melt kneading the resulting mixture at a maximum shear rate of 700 $sec^{-1}$ or higher, preferably 1300 $sec^{-1}$ or more.

The compatibilizing agent (i) is not critical, but at least one selected from the following groups ①–⑨ are preferred.

① Liqid diene polymers.

② Epoxy compounds having no ethylenically or acetylenically unsaturated bond.

③ Compounds having in the same molecule both (a) at least one unsaturated group, namely, carbon-carbon double bond or carbon-carbon triple bond and (b) at least one polar group.

④ Oxidized polyolefin wax.

⑤ Quinones.

⑥ Silane compounds having in the same molecule (a) at least one silicon atom bonded to carbon atom through bridge of oxygen and (b) at least ethylenic carbon-carbon double bond or carbon-carbon triple bond and/or a functional group selected from amino group and mercapto group, said functional group being not directly bonded to silicon atom.

⑦ Compounds having in the same molecule (a)—(OR), wherein R is hydrogen or alkyl, aryl, acyl or carbonyldioxy group, and (b) at least two same or different functional groups selected from carboxylic acids, acid halides, acid anhydrides, acid halide anhydrides, acid esters, acid amides, imides, amino and salts thereof.

⑧ Compounds having in the same molecule (a) acid halide group and (b) at least one of carboxylic acid, carboxylic acid anhydride, acid ester and acid amide groups.

⑨ Polyphenylene ethers made functional by previously reacting at least one compatibilizing agent selected from the groups ①–③ and ⑤–⑧ with polyphenylene ethers and compositions obtained by melt kneading at least one compatibilizing agent selected from the groups ①–⑧, polyphenylene ether and a small amount of polyamide. Use of these is also included in one embodiment of the present invention.

The compatibilizing agents of group ① are, for example, homopolymers of conjugated dienes and copolymers of one conjugated diene with other conjugated dienes or with vinyl monomers, namely, styrene, ethylene, propylene and the like, which have a number-average molecular weight of 150–10000, preferably 150–5000. Specific examples are polybutadiene, polyisoprene, poly(butylene/isoprene) and poly(styrene/butadiene).

The compatibilizing agents of the group ② include (1) condensates of polyhydric phenols such as bisphenol A, tetrabromobisphenol A and resorcin, with epichlorohydrin and (2) condensates of polyhydric alcohols such as ethylene glycol, propylene glycol and polyethylene glycol, with epichlorohydrin.

The compatibilizing agents of the group ③ are compounds having in the same molecule an unsaturated group, namely, carbon-carbon double bond or carbon-carbon triple bond and a polar group, namely, a functional group which has affinity or chemical reactivity with amide bond contained in polyamide resin, carboxyl group or amino group present at the terminal end of the chain. Examples of the functional group are carboxylic acid group, groups derived from carboxylic acids, namely, various salts, esters, acid amides, acid anhydrides, imides, acid azides or acid halides derived by substitution of hydrogen atom or hydroxyl group of carboxyl group, functional groups such as oxazoline group and nitrile group, epoxy group, amino group, hydroxyl group and isocyanate group. Compounds having both the unsaturated group and the polar group, namely, unsaturated carboxylic acids, unsaturated carboxylic acid derivatives, unsaturated epoxy compounds, unsaturated alcohols, unsaturated amines and unsaturated isocyanates can be used.

Examples of the compatibilizing agents of group ③ are maleic anhydride, maleic acid, fumaric acid, maleimide, maleic hydrazide, methyl nadic anhydride, dichloromaleic anhydride, maleinamide, itaconic acid, itaconic anhydride, natural fats and oils such as soybean oil, tung oil, caster oil, linseed oil, hempseed oil, cottonseed oil, sesame oil, rapeseed oil, peanut oil, tsubaki seed oil, olive oil, coconut oil and sardiene oil, epoxidized natural fats and oils such as epoxidized soybean oil, unsaturated carboxylic acids such as acrylic acid, butenoic acid, crotonic acid, vinylacetic acid, methacrylic acid, pentenoic acid, angelic acid, tiglic acid, 2-pentenoic acid, 3-pentenoic acid, α-ethylacrylic acid, β-methylcrotonic acid, 4-pentenoic acid, 2-hexenoic acid, 2-methyl-2-pentenoic acid, 3 -methyl-2-pentenoic acid, a -ethylcrotonic acid, 2,2 -dimethyl-3-butenoic acid, 2-heptenoic acid, 2-octenoic acid, 4-decenoic acid, 9-undecenoic acid, 10-undecenoic acid, 4-dodecenoic acid, 5-dodecenoic acid, 4-tetradecenoic acid, 9-tetradecenoic acid, 9-hexadecenoic acid, 2-octadecenoic acid, 9-octadecenoic acid, eicosenoic acid, docosenoic acid, erucic acid, tetracosenoic acid, mycolipenic acid, 2,4-pentadienoic acid, 2,4-hexadienoic acid, diallylacetic acid, geranic acid, 2,4-decadienoic acid, 2,4-dodecadienoic acid, 9,12-hexadecadienoic acid, 9,12-octadecadienoic acid, hexadecatrienic acid, linolic acid, linoleic acid, octadecatrienoic acid, eicosadienoic acid, eicosatrienoic acid, eicosatetraenoic acid, ricinoleic acid, eleostearic acid, oleic acid, eicosapentaenoic acid, erucic acid, docosadienoic acid, docosatrienoic acid, docosatetraenoic acid, docosapentaenoic acid, tetracosenoic acid, hexacosenoic acid, hexacodienoic acid, octacosenoic acid and tetracontenoic acid, esters, acid amides, anhydrides of these unsaturated carboxylic acids; unsaturated alcohols such as allyl alcohol, crotyl alcohol, methylvinylcarbinol, allylcarbinol, methylpropenylcarbinol, 4 -pentene-1-ol, 10-undecene-1-ol, propalgyl alcohol, 1,4 -pentadiene-3-ol, 1,4-hexadiene-3-ol, 3,5-hexadiene-2-ol, 2,4-hexadiene-1-ol, alcohols represented by the formulas $C_nC_{2n-5}OH$, $C_nC_{2n-7}OH$, $C_nC_{2n-9}OH$ (wherein n is a positive integer), 3-butene-1,2-diol, 2,5-dimethyl-3-hexene-2,5-diol, 1,5-hexadiene-3,4-diol and 2,6-octadiene-4,5-diol, unsaturated amines prepared by substituting the OH group of these unsaturated alcohols with —$NH_2$ group, glycidyl acrylate, glycidyl methacrylate and allyl glycidyl ether.

Further examples are low molecular weight polymers, for example, having an average molecular weight of 500–10000 or high molecular weight polymers, for example, having an average molecular weight of higher than 10000, such as of butadiene and isoprene, to which maleic anhydride or a phenol is added or into which amino group, carboxyl group, hydroxyl group or epoxy group is introduced, and allyl isocyanate.

Additional examples are reaction products of maleic anhydride with diamines such as those which have the structure represented by the following formula:

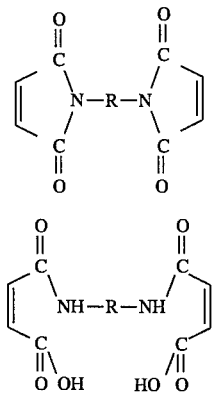

wherein R represents an aliphatic or aromatic group.

It is needless to say that the compounds having both unsaturated group and polar group in the same molecule include those which have two or more unsaturated groups and two or more polar groups which can be identical or different. Two or more specific compounds can also be used.

Among them, preferred are maleic anhydride, maleic acid, fumaric acid, itaconic anhydride, itaconic acid, glycidyl acrylate and glycidyl methacrylate and more preferred are maleic anhydride and fumaric acid.

The compatibilizing agents of group ④ are usually prepared by oxidation of polyolefin wax in the air or suspension. Polyethylene wax is preferred.

The compatibilizing agents of group ⑤ are compounds havin quinone structure and examples are 1,2- and 1,4-benzoquinone, 2,6-diphenylquinone, and 2-chloro- 1,4-benzoquinone.

The compatibilizing agents of group ⑥ are silane compounds having in the same molecule both (a) at least one silicon atom bonded to carbon atom through bridge of oxygen and (b) at least ethylenic carbon-carbon double bond or carbon-carbon triple bond and/or a functional group selected from amino group and mercapto group, said functional group being not directly bonded to silicon atom. Examples are γ-aminopropyltriethoxysilane and 2-(3-cyclohexyl)ethyltrimethoxysilane.

The compatibilizing agents of group ⑦ are aliphatic polycarboxylic acids, acid esters or acid amides thereof which are represented by the formula: $(R'O)_mR(COOR'')_n(CONR'''R^{IV})_l$, wherein R is a linear or branched saturated aliphatic hydrocarbon having 2–20 carbon atoms, preferably 2–10 carbon atoms, $R^I$ is hydrogen or an alkyl, aryl, acyl or carbonyldioxy group having 1–10, preferably 1–6, more preferably 1–4 carbon atoms, $R^{II}$ is hydrogen or an alkyl or aryl group having 1–20, preferably 1–10 carbon atoms, $R^{III}$ and $R^{IV}$ are independently hydrogen or an alkyl or aryl group having 1–10, preferably 1–6, most preferably 1–4 carbon atoms, m is 1, ( n+1) is 2 or more and preferably 2 or 3, n and 1 are each 0 or more, $(OR^I)$ is present at α- or β-position in respect to the carbonyl group and at least two carbonyl groups are separated by 2–6 carbon atoms, where it is clear that when carbon numbers of $R^I$, $R^{II}$, $R^{III}$ and $R^{IV}$ are less than 6, these are not aryl group.

Examples of these polycarboxylic acids are malic acid, and agaricic acid. Anhydrides and hydrates of these polycarboxylic acids can also be used. Examples of acid esters are acetyl citrate and mono- or distearyl citrate.

Examples of acid amides are N,N'-diethylcitric acid amide and N-dodecylcitric acid amide. Furthermore, derivatives of the polycarboxylic acids, especially preferably salts can also be used.

The compatibilizing agents of group ⑧ are compounds having in the same molecule at least one acid halide group, most preferably acid chloride group and at least one carboxylic acid group, carboxylic acid anhydride group, acid ester group or acid amide group, preferably carboxylic acid group or acid anhydride group.

Examples are trimellitic acid chloride and trimellitic acid chloride anhydride.

Use of compatibilizing agent (i) in an amount effective for compatibilization can attain the object of the present invention, but the amount of the compatibilizing agent (i) is preferably 0.01–20 parts, more preferably 0.1–10 parts by weight based on 100 parts by weight of (ii), (iii) and (iv). If it is less than 0.01 part by weight, the effect is small and if it is more than 20 parts by weight, the effect no longer increases.

In the present invention, homopolymers of alkenyl aromatic compounds or random copolymers of alkenyl aromatic compounds and unsaturated compounds can be added as an additional component.

Furthermore, inorganic fillers and/or impact strength modifiers or rubbers can also be used as an additional component.

The following nonlimiting examples illustrate the present invention. The blending ratios in the examples are all % by weight unless otherwise notified.

Examples 1–5 and Comparative Examples 1–5

A twin-screw extruder having three zones (TEX-30 manufactured by Nippon Seikosho K.K.) was used.

The following components A-1, A-2 and A-3 were introduced from initiation portion of the first zone of the extruder and kneaded at a cylinder temperature of 260° C.

Subsequently, the following components B-1, B-2 and B-3 were introduced from upper opening of initiation portion of the second zone and kneaded at a cylinder temperature of 230° C.

Furthermore, degassing was carried out by drawing a vacuum at 50 Torr from an opening for degassing in the third zone of the extruder.

The composition was taken out from the extruder through an orifice, cooled by water bath, granulated by a pelletizer and then dried.

Details of the components are as follows.

A-1-1: Maleic anhydride

A-1-2: Fumaric acid

A-1-3: Citric acid

A-2: Poly-(2,6-dimethyl-1,4-phenylene)-ether having a reduced viscosity of 0.54 dl/g measured in a chloroform solution of 0.5 g/dl at 25° C.

B-1-1: Polyamide 6 having a number-average molecular weight of 17500 (A1030BRL manufactured by Unitika, Ltd., —$NH_2$:60 mmol/kg, —COOH:60 mmol/kg)

B-1-2: Polyamide 6 having a number-average molecular weight of 12000 (A1020BRL manufactured by Unitika, Ltd., —$NH_2$:84 mmol/kg, —COOH:84 mmol/kg)

B-1-3: Polyamide 6,6 (A-100 manufactured by ICI Inc.)

B-2-1: Califlex TR1101 manufactured by Shell Chemical Co., (molecular weight of styrene part: 15000)

B-2-2: Califlex TR1102 manufactured by Shell Chemical Co., (molecular weight of styrene part: 10000)

B-2-3: Styrene-butadiene-styrene copolymer obtained by anion polymerization having molecular weights of 5000–30000–5000

B-2-4: Styrene-butadiene-styrene copolymer obtained by anion polymerization having molecular weights of 13500–36000–13500

The resulting composition was molded into test pieces by an injection molding machine IS220EN (manufactured by Toshiba Machine Co., Ltd.) for measurement of Izod impact strength (ASTM D256, notched test piece of 3.2 mm thick, 23° C., –30° C.) and hot distortion temperature (H.D.T., ASTM 648, 4.6 kg load).

Further, structure of impact strength modifier in polyphenylene ether was examined by observation with transmission electron microscope. Results of examination of the compositions in Example 1, Example 4 and Comparative Example 4 are shown in FIG. 1, FIG. 2 and FIG. 3 (20000×magnification), respectively.

FIGS. 1 and 2 are photographs of the compositions obtained in Examples 1 and 4 which show the structures where polyphenylene ether (grey spheres) is dispersed in matrix (white) and rubber particles (black ) are dispersed in the form of micro layers (FIG. 1) or in the form of micro spheres (FIG. 2) in the polyphenylene ether. Compositions having such a structure are high in impact strength. On the other hand, in the photograph of FIG. 3 which shows the composition obtained in Comparative Example 4, rubber particles are dispersed in the form of relatively large lumps and this composition is low in impact strength.

Blending ratio, process for preparation and results of tests are shown in Table 1.

Comparative examples were carried out in the same manner and blending ratio and results of tests are shown in Table 2.

TABLE 1

|   | Example 1 | Example 2 |
| --- | --- | --- |
| Temperature of the 1st zone | 260° C. | 260° C. |
| Temperature of the 2nd zone | 230° C. | 230° C. |
| Screw revolution speed | 300 rpm | 300 rpm |
| Maximum shear rate | 1400 | 1400 |

| Composition | A-mount | Introduction zone | A-mount | Introduction zone |
| --- | --- | --- | --- | --- |
| (i) A-1-1 | 0.6 | 1 | | |
| (i) A-1-2 | | | | |

TABLE 1-continued

| Composition | A-mount | Introduction zone | A-mount | Introduction zone |
|---|---|---|---|---|
| (i) A-1-3 | | | 0.7 | 1 |
| (ii) A-2 | 48 | 1 | 45 | 1 |
| (iii) B-1-1 | 43 | 2 | | |
| (iii) B-1-2 | | | | |
| (iii) B-1-3 | | | 45 | 2 |
| (iv) B-2-1 | 9 | 2 | | |
| (iv) B-2-2 | | | 10 | 2 |
| (iv) B-2-3 | | | | |
| (iv) B-2-4 | | | | |

| | | |
|---|---|---|
| Notched Izod impact strength at 23° C. (Kg.cm/cm) | 59 | 22.7 |
| Notched Izod insect strength at −30° C. (Kg.cm/cm) | 14.3 | 10.1 |
| HDT. 4.6 Kg (load) | 180° C. | 202° C. |
| Dispersion structure of A-B-A block polymer | Layered structure of 0.03 μm | Layered structure of 0.02 μm |

| | Example 3 | Example 4 |
|---|---|---|
| Temperature of the 1st zone | 260° C. | 260° C. |
| Temperature of the 2nd zone | 230° C. | 230° C. |
| Screw revolution speed | 450 rpm | 300 rpm |
| Maximun shear rate | 2100 | 1400 |

| Composition | A-mount | Introduction zone | A-mount | Introduction zone |
|---|---|---|---|---|
| (i) A-1-1 | | | 0.6 | 1 |
| (i) A-1-2 | 0.6 | 1 | | |
| (i) A-1-3 | | | | |
| (ii) A-2 | 48 | 1 | 48 | 1 |
| (iii) B-1-1 | | | 43 | 2 |
| (iii) B-1-2 | 42 | 2 | | |
| (iii) B-1-3 | | | | |
| (iv) B-2-1 | 10 | 2 | | |
| (iv) B-2-2 | | | | |
| (iv) B-2-3 | | | | |
| (iv) B-2-4 | | | 9 | 2 |

| | | |
|---|---|---|
| Notched Izod impact strength at 23° C. (Kg.cm/cm) | 51 | 70 |
| Notched Izod impact strength at −30° C. (Kg.cm/cm) | 11.8 | 20.8 |
| HDT. 4.6 Kg (load) | 182° C. | 178° C. |
| Dispersion structure of A-B-A block polymer | Layered structure of 0.03 μm | Layered structure of 0.06 μm |

| | Example 5 |
|---|---|
| Temperature of the 1st zone | 260° C. |
| Temperature of the 2nd zone | 230° C. |
| Screw revolution speed | 450 rpm |
| Maximum shear rate | 2100 |

| Composition | Amount | Introduction zone |
|---|---|---|
| (i) A-1-1 | 0.3 | 1 |
| (i) A-1-2 | | |
| (i) A-1-3 | | |
| (ii) A-2 | 48 | 1 |
| (iii) B-1-1 | 42 | 2 |
| (iii) B-1-2 | | |
| (iii) B-1-3 | | |
| (iv) B-2-1 | 10 | 2 |
| (iv) B-2-2 | | |
| (iv) B-2-3 | | |
| (iv) B-2-4 | | |

| | |
|---|---|
| Notched Izod insect strength at 23° C. (Kg.cm/cm) | 65 |
| Notched Izod impact strength at −30° C. (Kg.cm/cm) | 18.3 |
| HDT. 4.6 Kg (load) | 181° C. |
| Dispersion structure of A-B-A block polymer | Layered structure of 0.03 μm |

TABLE 2

| | Comparative Example 1 | Comparative Example 2 |
|---|---|---|
| Temperature of the 1st zone | 260° C. | 260° C. |
| Temperature of the 2nd zone | 230° C. | 230° C. |
| Screw revolution speed | 300 rpm | 300 rpm |
| Maximum shear rate | 1400 | 1400 |

| Composition | A-mount | Introduction zone | A-mount | Introduction zone |
|---|---|---|---|---|
| (i) A-1-1 | 0.6 | 1 | | |
| (i) A-1-2 | | | | |
| (i) A-1-3 | | | 0.7 | 1 |
| (ii) A-2 | 48 | 1 | 45 | 1 |
| (iii) B-1-1 | 43 | 2 | | |
| (iii) B-1-2 | | | | |
| (iii) B-1-3 | | | 45 | 2 |
| (iv) B-2-1 | 9 | 1 | | |
| (iv) B-2-2 | | | 10 | 1 |
| (iv) B-2-3 | | | | |

| | | |
|---|---|---|
| Notched Izod impact strength at 23° C. (Kg.cm/cm) | 47 | 12.3 |
| Notched Izod impact strength at −30° C. (Kg.cm/cm) | 7.1 | 5.1 |
| HDT. 4.6 Kg (load) | 172° C. | 193° C. |
| Dispersion structure of A-B-A block polymer | Lump structure of 0.2–0.3 μm | Lump structure of 0.25–0.6 μm |

| | Comparative Example 3 | Comparative Example 4 |
|---|---|---|
| Temperature of the 1st zone | 260° C. | 260° C. |
| Temperature of the 2nd zone | 230° C. | 280° C. |
| Screw revolution speed | 300 rpm | 300 rpm |
| Maximum shear rate | 1400 | 1400 |

| Composition | A-mount | Introduction zone | A-mount | Introduction zone |
|---|---|---|---|---|
| (i) A-1-1 | 0.6 | 1 | 0.3 | 1 |
| (i) A-1-2 | | | | |
| (i) A-1-3 | | | | |
| (ii) A-2 | 48 | 1 | 30 | 1 |
| (iii) B-1-1 | 43 | 2 | | |
| (iii) B-1-2 | | | 60 | 2 |
| (iii) B-1-3 | | | | |
| (iv) B-2-1 | | | 10 | 2 |
| (iv) B-2-2 | | | | |
| (iv) B-2-3 | 10 | 2 | | |

| | | |
|---|---|---|
| Notched Izod impact strength at 23° C. (Kg.cm/cm) | 14.2 | 15.3 |
| Notched Izod impact strength at −30° C. (Kg.cm/cm) | 5.7 | 6.3 |
| HDT. 4.6 Kg (load) | 175° C. | 181° C. |
| Dispersion structure of A-B-A block polymer | Lump structure of 0.3–0.6 μm | Lump structure of 1.0–3.0 μm |

| | Comparative Example 5 |
|---|---|
| Temperature of the 1st zone | 260° C. |
| Temperature of the 2nd zone | 230° C. |
| Screw revolution speed | 130 rpm |
| Maximum shear rate | 600 |

| Composition | Amount | Introduction zone |
|---|---|---|
| (i) A-1-1 | 0.3 | 1 |
| (i) A-1-2 | | |
| (i) A-1-3 | | |
| (ii) A-2 | 48 | 1 |
| (iii) B-1-1 | 42 | 2 |
| (iii) B-1-2 | | |

TABLE 2-continued

| | | |
|---|---|---|
| (iii) B-1-3 | | |
| (iv) B-2-1 | 10 | 2 |
| (iv) B-2-2 | | |
| (iv) B-2-3 | | |
| Notched Izod insect strength at 23° C. (Kg.cm/cm) | 15.3 | |
| Notched Izod impact strength at –30° C. (Kg.cm/cm) | 6.3 | |
| HDT. 4.6 Kg (load) | 181° C. | |
| Dispersion structure of A-B-A block polymer | Lump structure of 1.0–3.0 μm | |

What we claim is:

1. A thermoplastic resin composition comprising:
    a polyphenylene ether;
    a polyamide in an amount necessary for formation of a continuous phase;
    a compatibilizing agent in an amount effective for compatibilization; and
    an impact strength modifier having a structure A—B—A being partially dispersed in said polyphenylene ether in the form of a layered structure, each layer having a width of about 0.02–0.07 μm, or a spherical structure, each sphere having a diameter of about 0.02–0.07 μm, A or B being styrene and a number-average molecular weight of styrene units is 10,000 or more, and said composition being produced by a process comprising (1) previously preparing a modified-polyphenylene ether by melt kneading (i) said compatibilizing agent and (ii) said polyphenylene ether, and then (2) under melting states of said modified-polyphenylene ether, adding (iii) said polyamide and (iv) said impact strength modifier and melt kneading the mixture at a shear rate of 1300 sec$^{-1}$ 2100 sec$^{-1}$.

2. A thermoplastic resin composition according to claim 1, wherein an amount ratio of polyphenylene ether (ii)/polyamide (iii) is 5/95–70/30, an amount of an impact strength modifier (iv) is 1–50 parts by weight based on 100 parts by weight of (ii) and (iii), and an amount of a compatibilizing agent (i) is 0.01–20 parts by weight based on 100 parts by weight of (ii), (iii) and (iv).

3. A thermoplastic resin composition according to claim 1, wherein an amount ratio of polyphenylene ether (ii)/polyamide (iii) is 10/90–60/40, an amount of an impact strength modifier (iv) is 5–40 parts by weight based on 100 parts by weight of (ii) and (iii), and an amount of a compatibilizing agent (i) is 0.1–10 parts by weight based on 100 parts by weight of (ii), (iii) and (iv).

4. A thermoplastic resin composition according to claim 1, wherein said polyphenylene ether is obtained by the oxidative polymerization of one or more phenyl compounds represented by the following formula (I) with oxygen or a gas containing oxygen using an oxidative coupling catalyst:

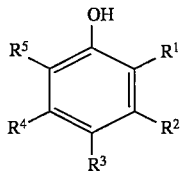
(I)

wherein $R^1$, $R^2$, $R^3$, $R^4$ and $R^5$ each represents a hydrogen atom, a halogen atom or a substituted or unsubstituted hydrocarbon group, and at least one of $R^1$, $R^2$, $R^3$, $R^4$ and $R^5$ is a hydrogen atom.

5. A thermoplastic resin composition according to claim 4, wherein $R^1$, $R^2$, $R^3$, $R^4$ and $R^5$ represents a hydrogen atom, a halogen atom or a hydrocarbon or substituted hydrocarbon group of 1–18 carbon atoms.

6. A thermoplastic resin composition according to claim 5, wherein said hydrocarbon is selected from the group consisting of methyl, ethyl, n-propyl, iso-propyl, pri-butyl, sec-butyl, t-butyl, chloroethyl, hydroxyethyl, phenylethyl, hydroxymethyl, carboxyethyl, methoxycarbonylethyl and cyanoethyl, and said substituted hydrocarbon is selected from the group consisting of phenyl, chlorophenyl, methylphenyl, dimethylphenyl ethylphenyl, benzyl and allyl.

7. A thermoplastic resin composition according to claim 1, wherein the polyphenylene ether is selected from the group consisting of homopolymers of 2,6-dimethylphenol and 2,6-diphenylphenol, and copolymers of 2,6-dimethylphenol and 3-methyl-6-t-butylphenol, and 2,6-dimethylphenol and 2,3,6-trimethylphenol.

8. A thermoplastic resin composition according to claim 1, wherein said polyamide is selected from the group consisting of crystalline aliphatic polyamides and aromatic polyamides.

9. A thermoplastic resin composition according to claim 8, wherein said polyamide is a crystalline aliphatic polyamide selected from the group consisting of nylon 46, nylon 6, nylon 66, nylon 11, and nylon 12.

10. A thermoplastic resin composition according to claim 8, wherein said aromatic polyamide is an amorphorous aromatic polyamide.

11. A thermoplastic resin composition according to claim 1, wherein said impact strength modifier is selected from the group consisting of triblock copolymers and radial teleblock copolymers of styrene and conjugated dienes.

12. A thermoplastic resin composition according to claim 11, wherein said impact strength modifier is a styrene butadiene styrene triblock copolymer.

13. A thermoplastic resin composition according to claim 12, wherein the number average molecular weight of the polystyrene chain is 12,000 or more.

14. A thermoplastic resin composition comprising:
    a polyphenylene ether obtained by the oxidative polymerization of one or more phenyl compounds represented by the following formula (I) with oxygen or a gas containing oxygen using an oxidative coupling catalyst:

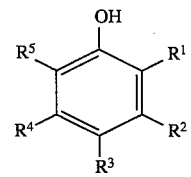
(I)

wherein $R^1$, $R^2$, $R^3$, $R^4$ and $R^5$ each represents a hydrogen atom, a halogen atom or a substituted or unsubstituted hydrocarbon group, and at least one of $R^1$, $R^2$, $R^3$, $R^4$ and $R^5$ is a hydrogen atom;
    a polyamide selected from the group consisting of crystalline aliphatic polyamides and aromatic polyamides in an amount necessary for formation of a continuous phase;
    a compatibilizing agent in an amount effective for compatibilization; and
    an impact strength modifier having a structure A—B—A selected from the group consisting of triblock copolymers and radial teleblock copolymers of styrene and conjugated dienes, a number-average molecular weight of styrene units being 10,000 or more, said impact strength modifier being partially dispersed in said polyphenylene ether in the form of a layered structure, each layer having a width of about 0.02–0.07 μm, or a spherical structure, each sphere having a diameter of about 0.02–0.07 μm, and said composition being produced by a process comprising (1) previously melt kneading (i) said compatibilizing agent and (ii) said polyphenylene ether and then (2) adding (iii) said polyamide and (iv) said impact strength modifier and melt kneading the mixture at a shear rate of 1300 $sec^{-1}$ or more.

* * * * *